(12) United States Patent
Kim (10) Patent No.: US 11,472,408 B2
(45) Date of Patent: Oct. 18, 2022

(54) DEVICE AND METHOD FOR CONTROLLING TRAVEL OF VEHICLE

(71) Applicants: Hyundai Motor Company, Seoul (KR); Kia Corporation, Seoul (KR)

(72) Inventor: Kyeong Eun Kim, Gunpo-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 6 days.

(21) Appl. No.: 17/333,586

(22) Filed: May 28, 2021

(65) Prior Publication Data

US 2022/0118975 A1 Apr. 21, 2022

(30) Foreign Application Priority Data

Oct. 19, 2020 (KR) .................. 10-2020-0135368

(51) Int. Cl.
*B64C 1/00* (2006.01)
*B60W 30/14* (2006.01)
*B60W 50/14* (2020.01)
*B60W 40/09* (2012.01)

(52) U.S. Cl.
CPC .......... *B60W 30/146* (2013.01); *B60W 40/09* (2013.01); *B60W 50/14* (2013.01); *B60W 2520/10* (2013.01)

(58) Field of Classification Search
CPC .... B60W 39/02; B60W 39/09; B60W 39/056; B60W 39/12; B60W 39/16; B60W 39/162; B60W 39/165
See application file for complete search history.

(56) References Cited

U.S. PATENT DOCUMENTS

| | | | |
|---|---|---|---|
| 11,001,274 B2 | 5/2021 | Lee et al. | |
| 2019/0202472 A1 | 7/2019 | Lee et al. | |
| 2020/0047746 A1* | 2/2020 | Ji | B60W 50/14 |
| 2022/0118975 A1* | 4/2022 | Kim | B60W 50/0205 |
| 2022/0227280 A1* | 7/2022 | Thieberger | G05D 1/0088 |
| 2022/0230168 A1* | 7/2022 | Barakat | G06Q 20/40 |

FOREIGN PATENT DOCUMENTS

| | | |
|---|---|---|
| KR | 100283321 B1 | 4/2001 |
| KR | 20190079844 A | 7/2019 |

* cited by examiner

*Primary Examiner* — John Kwon
(74) *Attorney, Agent, or Firm* — Slater Matsil, LLP (57) ABSTRACT

A device for controlling travel of a vehicle includes an input device configured to receive user setting information, a sensor configured to acquire user state information, travel information of the vehicle, and vehicle surroundings information, and a controller configured to calculate an ADAS operation reliability based on the travel information of the vehicle and the vehicle surroundings information, calculate at least one of a vehicle set speed and/or a warning time point based on the user setting information and an ADAS reliability determination value when careless driving of a user is determined based on the user state information, and determine whether to perform vehicle stop control.

20 Claims, 9 Drawing Sheets

| USM | ADAS | CONTROL SET SPEED DURING CARELESS DRIVING | WARNING TIME POINT | VEHICLE STOP CONTROL |
|---|---|---|---|---|
| HIGH | HIGH | SetSpeed1 | x | x |
| HIGH | MID | SetSpeed2 | x | x |
| HIGH | LOW | SetSpeed2 | now | 0 |
| MID | HIGH | SetSpeed3 | x | x |
| MID | MID | SetSpeed3 | delay | 0 |
| MID | LOW | SetSpeed3 | now | 0 |
| LOW | HIGH | SetSpeed3 | now | 0 |
| LOW | MID | SetSpeed3 | now | 0 |
| LOW | LOW | SetSpeed3 | now | 0 |

DEVICE AND METHOD FOR CONTROLLING TRAVEL OF VEHICLE

CROSS-REFERENCE TO RELATED APPLICATIONS

This application claims the benefit of Korean Patent Application No. 10-2020-0135368, filed in the Korean Intellectual Property Office on Oct. 19, 2020, which application is hereby incorporated herein by reference.

TECHNICAL FIELD

The present disclosure relates to a device and a method for controlling travel of a vehicle.

BACKGROUND

Recently, a function of assisting travel of a vehicle has been developed to increase convenience of a user. In general, the travel assist function of the vehicle is operated based on a state of the user, and determines a degree of risk based on the user state to automatically activate an advanced driver-assistance system (ADAS) function when the degree of risk is high and automatically deactivate the ADAS function when the degree of risk is low.

The travel assist function of the vehicle operating based on the user state as described above is activated when a driver drives while drowsy or drives carelessly. When there is no response from the user after being activated, the travel assist function of the vehicle performs vehicle stop control while maintaining a line. Because a warning for such careless driving and the vehicle stop control are operated regardless of an ADAS operation reliability, the warning for the careless driving and braking control may occur frequently, which may cause discomfort to the user.

SUMMARY

The present disclosure relates to a device and a method for controlling travel of a vehicle. Embodiments of the present disclosure can solve problems occurring in the prior art while advantages achieved by the prior art are maintained intact.

An embodiment of the present disclosure provides a device and a method for controlling travel of a vehicle in which a travel assist function of the vehicle prevents a warning for careless driving and vehicle stop control from being frequently performed based on an ADAS operation reliability, and change an inter-vehicle distance and a set speed to improve travel stability, thereby minimizing discomfort felt by a user.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, a device for controlling travel of a vehicle includes an input device that receives user setting information, a sensor that acquires user state information, travel information of the vehicle, and vehicle surroundings information, and a controller that calculates an ADAS operation reliability based on the travel information of the vehicle and the vehicle surroundings information, calculates at least one of a vehicle set speed and/or a warning time point based on the user setting information and an ADAS reliability determination value when careless driving of a user is determined based on the user state information, and determines whether to perform vehicle stop control.

In one implementation, the user setting information may be input as USM HIGH when the careless driving of the user is allowed, as USM MID when the careless driving of the user is allowed based on the ADAS operation reliability, and as USM LOW when the careless driving of the user is not allowed.

In one implementation, the controller may compare a set speed preset to the vehicle with an ADAS maximum safety speed or a road speed limit set in advance based on the user setting information and the ADAS reliability determination value when the careless driving of the user is continued, and calculate the vehicle set speed based on the comparison result.

In one implementation, the controller may set the ADAS reliability determination value as one of ADAS LOW, ADAS MID, and ADAS HIGH based on a magnitude of the ADAS operation reliability.

In one implementation, the controller may determine whether a first condition including a case where the user setting information is the USM HIGH and the ADAS reliability determination value is the ADAS HIGH or the ADAS MID, or a second condition including a case where the user setting information is the USM MID and the ADAS reliability determination value is the ADAS HIGH is satisfied.

In one implementation, the controller may not output a warning for the careless driving of the user and not perform the vehicle stop control when one of the first condition and the second condition is satisfied.

In one implementation, the controller may determine whether a third condition including a case where the user setting information is the USM MID and the ADAS reliability determination value is the ADAS MID is satisfied when the first condition and the second condition are not satisfied.

In one implementation, the controller may calculate a warning output delay time based on the ADAS operation reliability and the ADAS MID when the third condition is satisfied, and control the warning to be output after the warning output delay time elapses when the careless driving of the user continues even after the warning output delay time elapses.

In one implementation, the controller may control the warning to be output immediately when the careless driving of the user is determined when the third condition is not satisfied.

In one implementation, the controller may determine to stop the vehicle when the careless driving of the user continues even after a set time for controlling the vehicle stop elapses after the warning is output.

According to another embodiment of the present disclosure, a method for controlling travel of a vehicle includes receiving user setting information, acquiring user state information, travel information of the vehicle, and vehicle surroundings information, calculating an ADAS operation reliability based on the travel information of the vehicle and the vehicle surroundings information, and calculating at least one of a vehicle set speed and/or a warning time point based on the user setting information and an ADAS reliability determination value when careless driving of a user is determined based on the user state information, and determining whether to perform vehicle stop control.

In one implementation, the receiving of the user setting information may include receiving the user setting information as USM HIGH when the careless driving of the user is allowed, as USM MID when the careless driving of the user is allowed based on the ADAS operation reliability, and as USM LOW when the careless driving of the user is not allowed.

In one implementation, a set speed preset to the vehicle may be compared with an ADAS maximum safety speed or a road speed limit set in advance based on the user setting information and the ADAS reliability determination value when the careless driving of the user is continued, and the vehicle set speed may be calculated based on the comparison result.

In one implementation, the ADAS reliability determination value may be set as one of ADAS LOW, ADAS MID, and ADAS HIGH based on a magnitude of the ADAS operation reliability.

In one implementation, the method may further include determining whether a first condition including a case where the user setting information is the USM HIGH and the ADAS reliability determination value is the ADAS HIGH or the ADAS MID, or a second condition including a case where the user setting information is the USM MID and the ADAS reliability determination value is the ADAS HIGH is satisfied.

In one implementation, a warning for the careless driving of the user may not be output and the vehicle stop control may not be performed when one of the first condition and the second condition is satisfied.

In one implementation, the method may further include determining whether a third condition including a case where the user setting information is the USM MID and the ADAS reliability determination value is the ADAS MID is satisfied when the first condition and the second condition are not satisfied.

In one implementation, a warning output delay time may be calculated based on the ADAS operation reliability and the ADAS MID when the third condition is satisfied, and the warning for the careless driving of the user may be controlled to be output after the warning output delay time elapses when the careless driving of the user continues even after the warning output delay time elapses.

In one implementation, the warning for the careless driving of the user may be controlled to be output immediately when the careless driving of the user is determined when the third condition is not satisfied.

In one implementation, the vehicle may be determined to be stopped when the careless driving of the user continues even after a set time for controlling the vehicle stop elapses after the warning is output.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
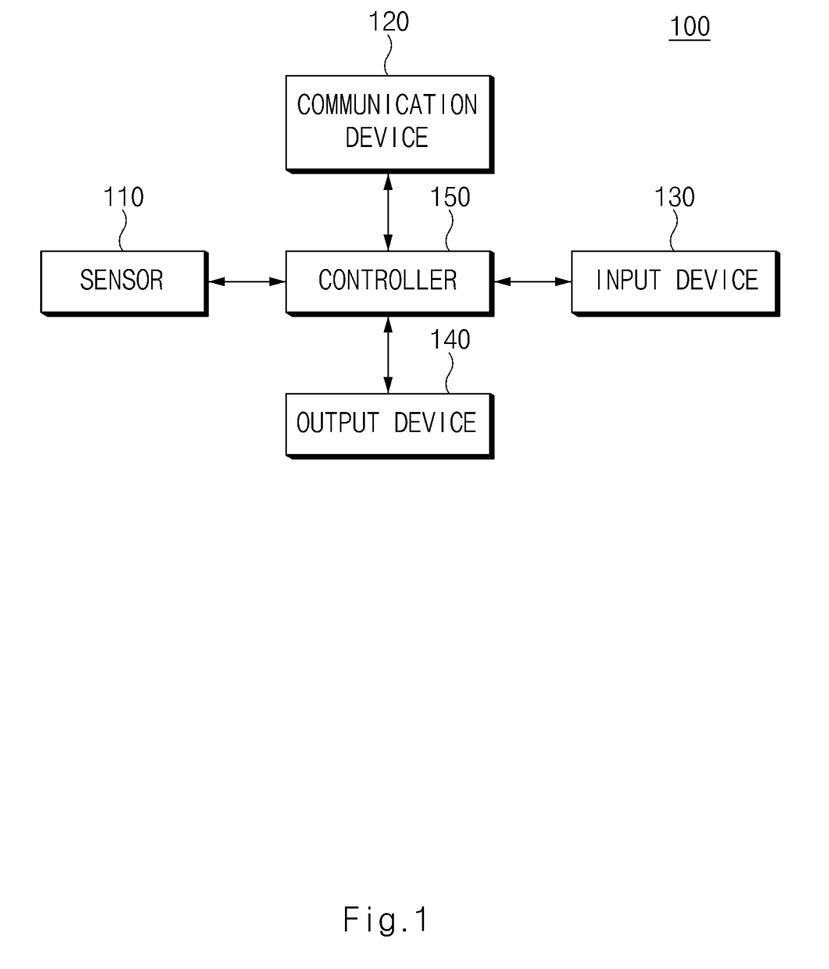
FIG. 1 is a block diagram illustrating a travel control device of a vehicle according to an embodiment of the present disclosure.

FIG. 1 is a block diagram illustrating a travel control device of a vehicle according to an embodiment of the present disclosure.

As shown in FIG. 1, a travel control device 100 of a vehicle according to an embodiment of the present disclosure may include a sensor 110, a communication device 120, an input device 130, an output device 140, and a controller 150.

The sensor 110 may acquire user state information, travel information of the vehicle, and surroundings information of the vehicle. According to an embodiment, the sensor 110 may include an image sensor for acquiring the user state information and a sensor for sensing a biometric signal. In this connection, the user state information may include information for determining whether a user is in a drowsy state or a state of not looking forward, and for example, may include user blink information and gaze direction information. In addition, the sensor 110 may include a speed sensor and a heading angle sensor for acquiring the travel information of the vehicle. In this connection, the travel information of the vehicle may include speed and heading angle information of the vehicle. In addition, the sensor 110 may include an image sensor, a radar, a lidar, and the like, for acquiring the surroundings information of the vehicle. In this connection, the surroundings information of the vehicle may include information (curvature information and line information) of a road on which the vehicle is traveling, information (a type of an obstacle and a distance to the obstacle) of the obstacle in front of the vehicle, and road surface state information.

The communication device 120 may wirelessly communicate with a server, and may communicate with a surrounding vehicle or a surrounding object in a V2V or V2X scheme. The communication device 120 may receive weather information of a region in which the vehicle is located from the server, and may receive accident information (an accident occurrence rate), construction information, demonstration information, and the like of the travel road from the server.

The input device 130 may receive user setting information. According to an embodiment, the input device 130 may receive an input signal corresponding to a manipulation, an operation, or a voice of the user. In this connection, according to an embodiment of the present disclosure, the user setting information may be input as USM HIGH when careless driving of the user is allowed without specific conditions, input as USM MID when the careless driving of the user is allowed based on an ADAS operation reliability, and input as USM LOW when the careless driving of the user is not allowed.

The output device 140 may visually or audibly output a warning for a careless driving state of the user based on a determination result from the controller 150. To this end, the output device 140 may include a display device such as a cluster, a navigation display, and the like, and may include a sound output device such as a speaker.

The controller 150 may be implemented by various processing devices such as a microprocessor or the like including a semiconductor chip or the like capable of performing operation or execution of various commands embedded therein, and may control an operation of the travel control device of the vehicle according to an embodiment of the present disclosure.

The controller 150 determines whether the user is in the careless driving state based on the user state information sensed by the sensor 11o. According to an embodiment, the controller 150 may determine whether the user is in the careless driving state based on a blink degree of the user, the gaze direction information, and the like. When determining that the user is in the careless driving state, the controller 150 calculates the ADAS operation reliability. In this connection, the ADAS operation reliability may be calculated as the smallest value among a first reliability for an ADAS operation condition, a second reliability for a smart cruise control (SCC) operation, and a third reliability for a lane following assist (LFA) operation. The ADAS operation reliability may have a value within a range from 0% to 100%. A more detailed description will be achieved with reference to FIG. 2.

Figure 2:
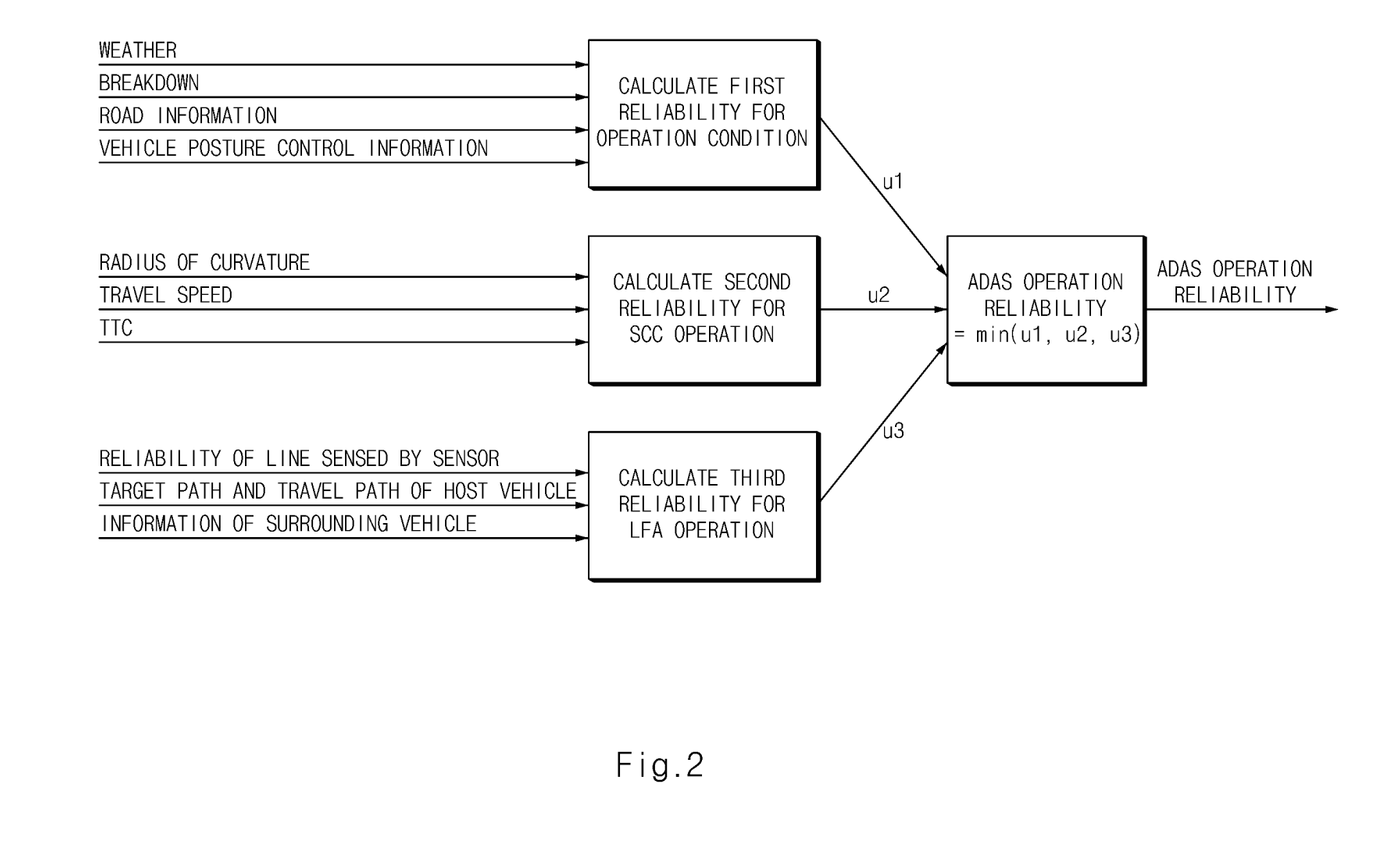
FIG. 2 is a diagram illustrating an ADAS operation reliability according to an embodiment of the present disclosure.

FIG. 2 is a diagram illustrating an ADAS operation reliability according to an embodiment of the present disclosure.

As shown in FIG. 2, the controller 150 may calculate a first reliability u1 for the ADAS operation condition based on the weather information, ADAS normal operation information (breakdown), the road information, and vehicle posture control information. In addition, the controller 150 may calculate a second reliability u2 for the SCC operation based on a radius of curvature of the road on which the vehicle is traveling, a travel speed, and a time to collision (TTC). In addition, the controller 150 may calculate a third reliability u3 for the LFA operation based on a line sensed by the sensor, a target path and a travel path of a host vehicle, and information of the surrounding vehicle. In addition, the controller 150 may calculate the smallest value among the first reliability u1, the second reliability u2, and the third reliability u3 as the ADAS operation reliability.

First, the controller 150 may acquire the weather information from the server to calculate the first reliability u1. The controller 150 may acquire information such as a temperature, a cloud amount, a humidity level, sunset/sunrise times, a rainfall amount, and the like, and may extract the smallest value among a temperature reliability, a cloud amount reliability, and a humidity reliability to calculate the first reliability. In addition, the controller 150 may lower the weather reliability at the sunset/sunrise times and at night in consideration of the sunset/sunrise times, and may set the weather reliability to 0% on rainy or snowy days. A more detailed description will be achieved with reference to FIG. 3A to FIG. 3C.

Figure 3A:
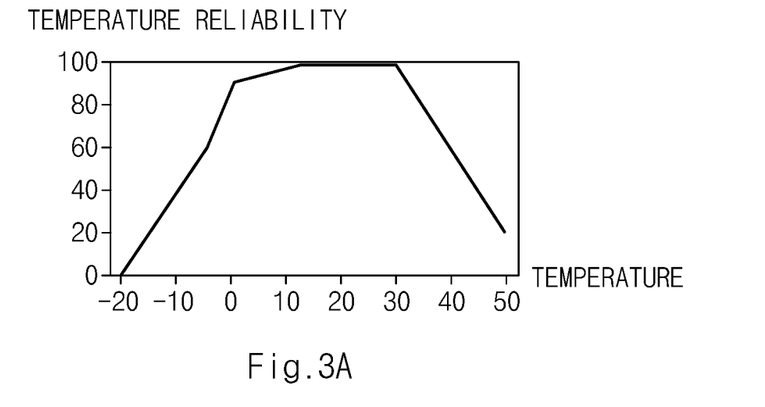
FIG. 3A to FIG. 3C are diagrams schematically illustrating an ADAS operation condition reliability calculation scheme according to an embodiment of the present disclosure.
Figure 3B:
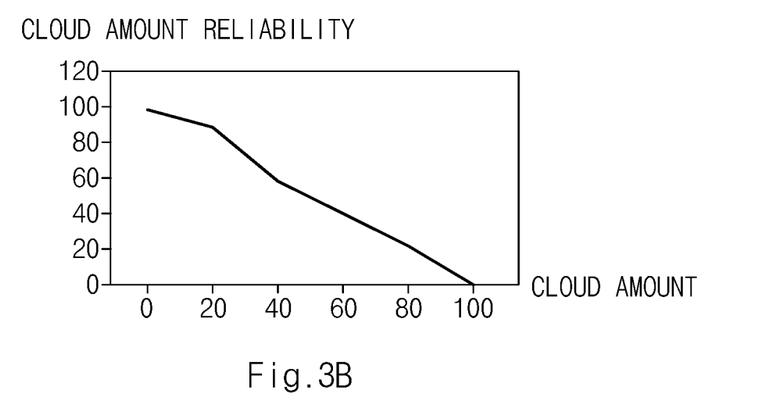
Figure 3C:
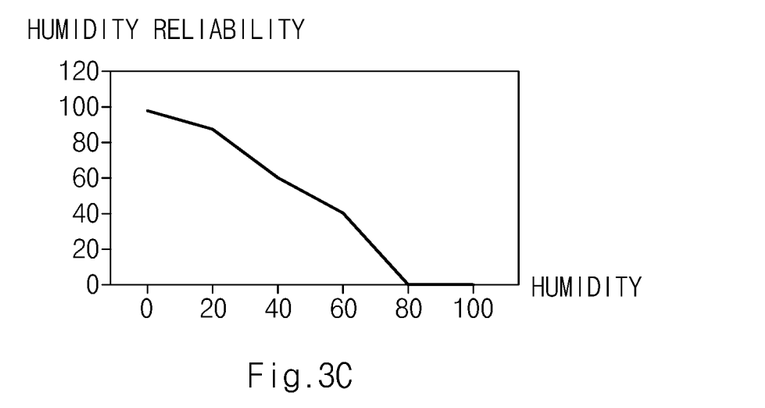

FIG. 3A to FIG. 3C are diagrams schematically illustrating an ADAS operation condition reliability calculation scheme according to an embodiment of the present disclosure.

As shown in FIG. 3A to FIG. 3C, the controller 150 may calculate a weather reliability value based on a reliability function specified based on the temperature, the cloud amount, and the humidity acquired by the sensor 110. When a current temperature is 25 degrees, the cloud amount is 2, and the humidity is 25%, the weather reliability may be set as a value (e.g., 95%) obtained by multiplying the smallest value among the temperature reliability, the cloud amount reliability, and the humidity reliability by the time (the sunset/the sunrise/the night) information.

The controller 150 may set the reliability based on whether the normal operation of the ADAS (normal operations of the sensor, the communication device, and the like) is performed, may set the operation reliability to 100% when the ADAS performs the normal operation, and may set the operation reliability to 0% when any of the devices performs the abnormal operation.

The controller 150 may determine whether the road on which the vehicle is traveling is in a road condition in which an ADAS operation is possible. For example, when there is no accident occurrence, construction information, or demonstration information on the road on which the vehicle is traveling, a road surface state is also a normal state (a non-frozen or non-washed state), there is no traffic light, crosswalk, or intersection, the road is not in an accident-frequent-region, and a curvature and a road gradient satisfy the ADAS operation condition, the controller 150 may set a road reliability to 100%. When any of the conditions described above is not satisfied, the road reliability may be set to 0%.

In addition, the controller 150 may determine whether an anti-lock brake system (ABS) and an anti-spin regulator (ASR) operate normally. The controller 150 may set a vehicle posture control reliability to 100% when the ABS and the ASR operate normally, and may set the vehicle posture control reliability to 95% when only one is operated.

The controller 150 may calculate the first reliability for the ADAS operation condition based on the reliability set based on the above-described conditions. For example, when the reliabilities respectively set based on the conditions described above are set as shown in Table 1, the first reliability may be calculated as 95%.

TABLE 1

| Weather reliability | Operation reliability | Road reliability | Vehicle posture control reliability | First reliability |
|---|---|---|---|---|
| 96% | Normal (100%) | Normal (100%) | ABS operation (95%) | 95% |

Figure 4:
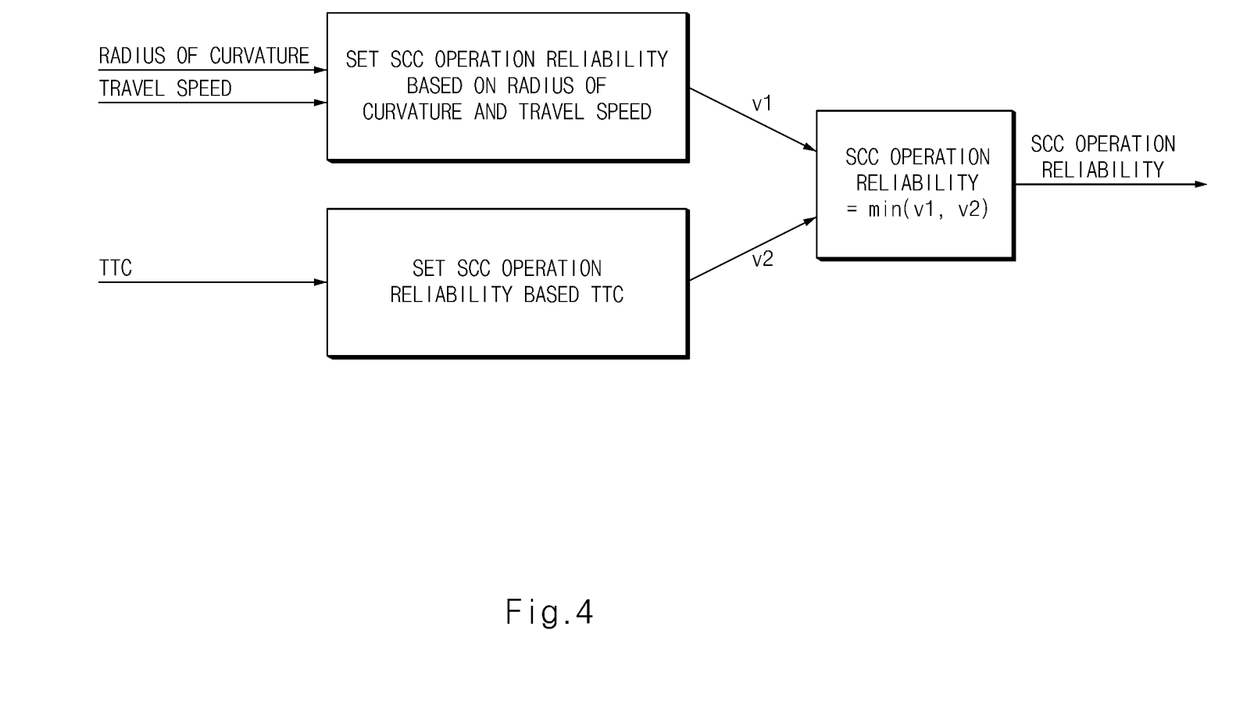
FIG. 4 is a diagram schematically illustrating a smart cruise control (SCC) operation reliability calculation scheme according to an embodiment of the present disclosure.

FIG. 4 is a diagram schematically illustrating an SCC operation reliability calculation scheme according to an embodiment of the present disclosure.

As shown in FIG. 4, the controller 150 may set a reliability v1 based on the smart cruise control (SCC) operation based on the radius of curvature of the road and the travel speed of the vehicle, and may set a reliability v2 based on the smart cruise control (SCC) operation based on the time to collision (TIC). In addition, the controller 150 may calculate a small value among the reliability v1 and the reliability v2 as the second reliability u2. According to an embodiment of the present disclosure, the controller 150 may set the reliability to become greater as the radius of curvature of the travel road increases (becomes closer to a straight line) and the travel speed of the vehicle decreases. In addition, the controller 150 may set the reliability to become greater as the TTC increases. When there is no target, the controller 150 may set the TIC to infinite.

Figure 5:
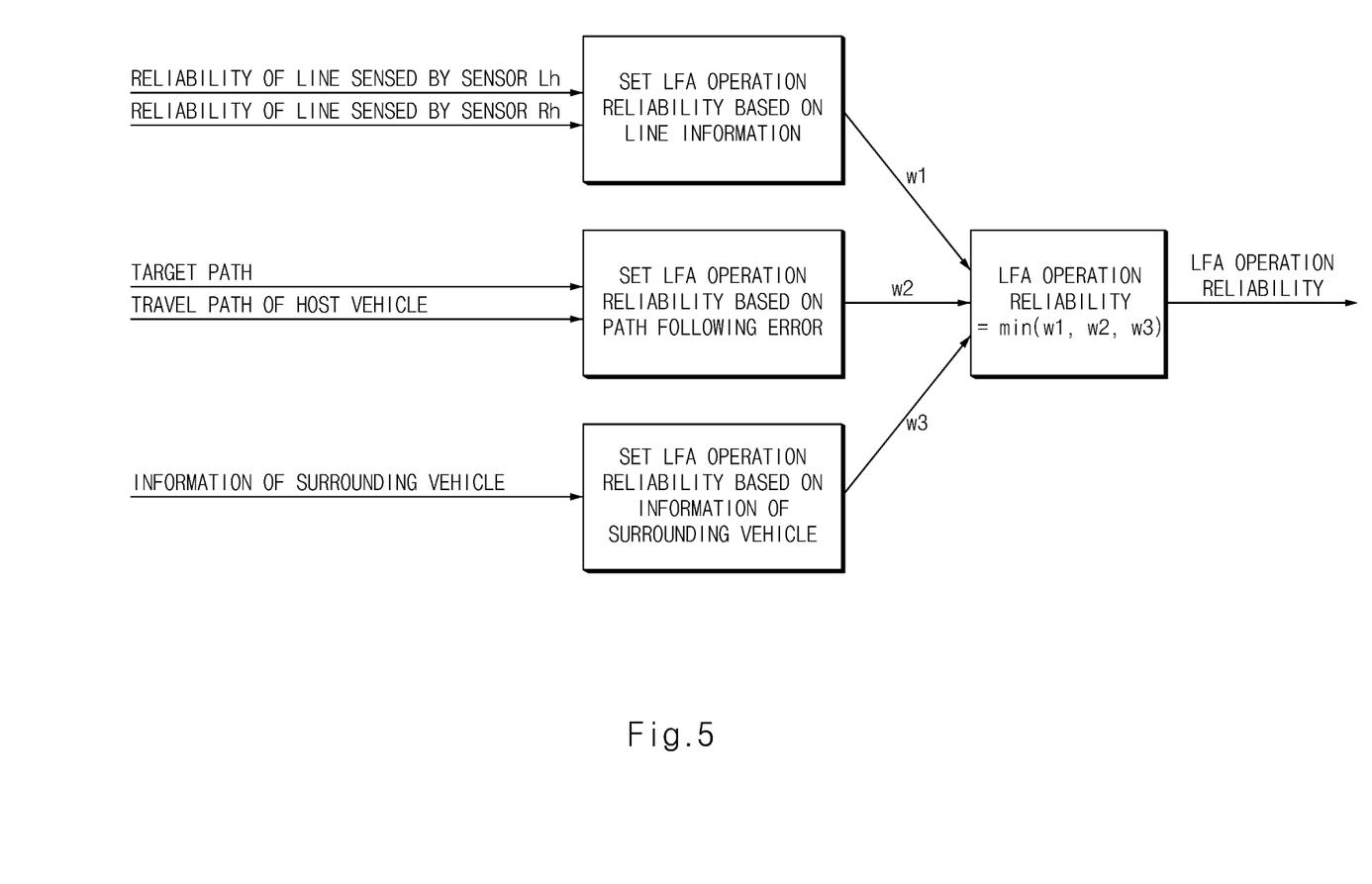
FIG. 5 is a diagram schematically illustrating a lane following assist (LFA) operation reliability calculation scheme according to an embodiment of the present disclosure.

FIG. 5 is a diagram schematically illustrating an LFA operation reliability calculation scheme according to an embodiment of the present disclosure.

The controller 150 may set a reliability w1 of the line information (a right line and a left line), as shown in FIG. 5. According to an embodiment, the controller 150 may set a lower value among a reliability of the right line and a reliability of the left line as the reliability w1. In addition, the controller 150 may compare the target path and the travel path of the vehicle with each other, and set a reliability w2 based on the comparison result. According to an embodiment, the controller 150 may calculate an error between the target path and the travel path generated based on the line information, and determine how much a heading angle is deviated. The controller 150 may set the reliability w2 low because the greater the error, the more control must be accompanied. In addition, the controller 150 may set a reliability w3 based on whether a vehicle traveling around the vehicle is sensed. According to an embodiment, the controller 150 may set the reliability w3 low because there is a risk of collision when the vehicle traveling around the vehicle is sensed.

The controller 150 may calculate the smallest value among the reliability w1, the reliability w2, and the reliability w3 set as described above as the third reliability u3. For example, when the first reliability u1, the second reliability u2, and the third reliability u3 are set as shown in Table 2, the ADAS operation reliability may be represented as 75%.

TABLE 2

| First reliability u1 | Second reliability u2 | Third reliability u3 | ADAS operation reliability |
|---|---|---|---|
| 95% | 80% | 75% | 75% |

The controller 150 may set an ADAS reliability determination value based on a magnitude of the ADAS operation reliability calculated as described above. In this connection, the ADAS reliability determination value may include one of ADAS LOW, ADAS MID, and ADAS HIGH, and the ADAS reliability determination value may be set by a designer. For example, the designer may set the ADAS reliability determination value to the ADAS HIGH when the ADAS operation reliability is equal to or higher than 90%, set the ADAS reliability determination value to the ADAS MID when the ADAS operation reliability is equal to or higher than 75% and lower than 90%, and set the ADAS reliability determination value to the ADAS LOW when the ADAS operation reliability is lower than 75%. When the ADAS reliability determination value is set by the designer as described above, the controller 150 may determine the reliability determination value for the ADAS operation reliability calculated as shown in Table 2 as the ADAS MID.

The controller 150 may determine a degree of allowance of the careless driving based on the user setting information input by the input device 130. In this connection, the user setting information may include the USM HIGH, the USM MID, and the USM LOW based on the degree of allowance of the careless driving.

The controller 150 may allow a guide message to be provided to the user to be generated and output based on the ADAS reliability determination value and the user setting information. The operation of the controller 150 described above will be described in detail with reference to FIG. 6 below.

Figure 6:
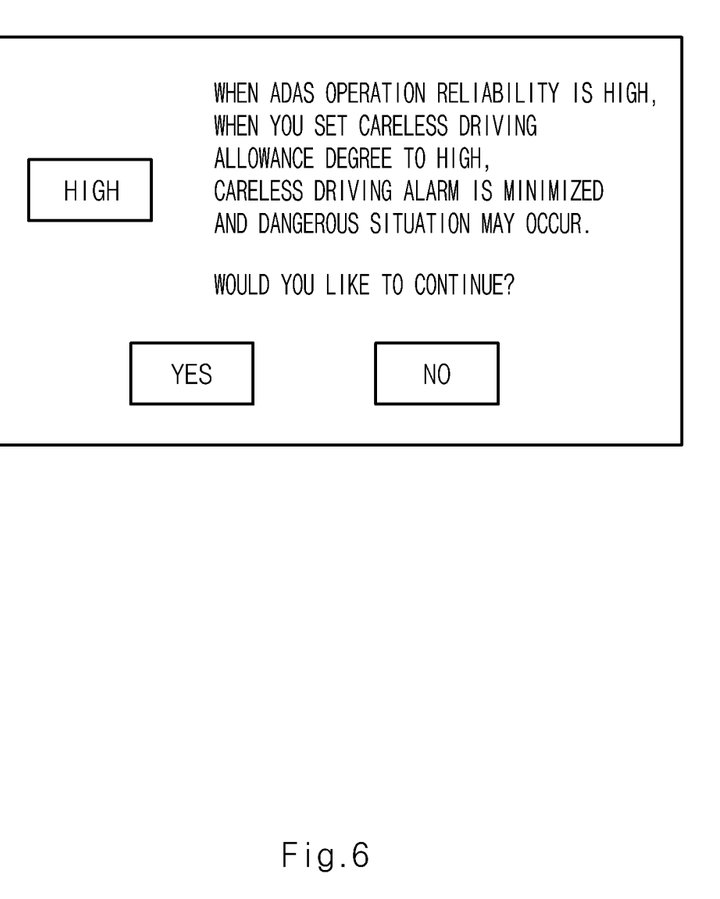
FIG. 6 is a diagram illustrating a guide message output based on user setting information according to an embodiment of the present disclosure.

FIG. 6 is a diagram illustrating a guide message output based on user setting information according to an embodiment of the present disclosure.

As shown in FIG. 6, when the ADAS reliability determination value is the ADAS HIGH and the user setting information is the USM HIGH, the controller 150 may allow a guide message informing that a dangerous situation may occur because the warning for the careless driving is minimized to be generated and output. That is, the controller 150 may intuitively guide which situation may be caused by the degree of allowance of the careless driving based on the setting information set by the user, which may be recognized by the user.

The controller 150 may determine the travel speed of the vehicle based on the user setting information and calculate a warning time point for the careless driving. When the careless driving is sensed, the controller 150 may determine the travel speed of the vehicle, change the travel speed of the vehicle such that a preset inter-vehicle distance is maintained, and determine whether to stop the vehicle. A more detailed description will be achieved in detail with reference to FIG. 7.

Figure 7:
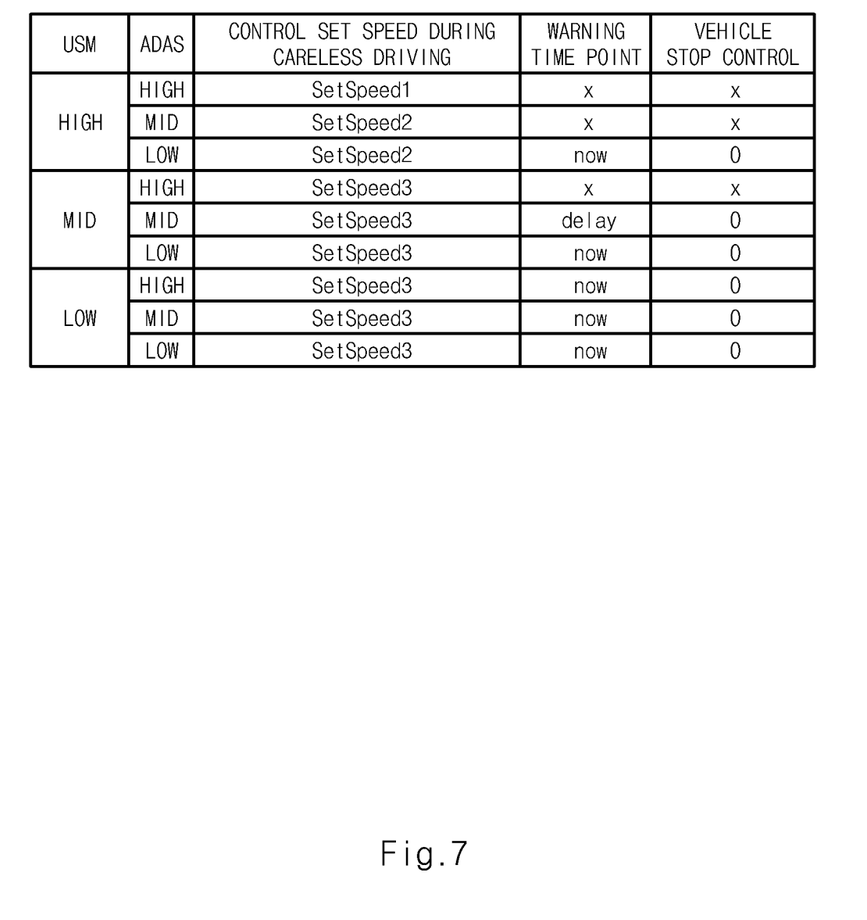
FIG. 7 is a view illustrating a vehicle control speed, a warning time point, and whether to perform vehicle stop control set based on user setting information and an ADAS reliability according to an embodiment of the present disclosure.

FIG. 7 is a view illustrating a vehicle control speed, a warning time point, and whether to perform vehicle stop control set based on user setting information and an ADAS reliability according to an embodiment of the present disclosure.

As shown in FIG. 7, according to an embodiment, when the careless driving of the user continues, the user setting information is the USM HIGH, and the ADAS reliability determination value is the ADAS HIGH, the controller 150 may set a small value among a set speed currently set to the vehicle and a preset ADAS maximum safety speed as a first speed (a speed 1), and set a vehicle set speed to the first speed. In this connection, the preset ADAS maximum safety speed (a speed of the vehicle at which an ADAS function may safely operate, set by the designer based on an experimental value) may be smaller than an ADAS travel maximum control speed (a maximum speed of the vehicle at which the ADAS function may be performed). In addition, even when the careless driving continues, the controller 150 does not output the warning for the careless driving and does not perform the vehicle stop control.

In addition, when the careless driving of the user continues, the user setting information is the USM HIGH, and the ADAS reliability determination value is the ADAS MID or the ADAS LOW, the controller 150 may set a smaller value among the set speed currently set to the vehicle and a speed limit of the road as a second speed (a speed 2), and set the vehicle set speed to the second speed. In addition, when the user setting information is the USM HIGH and the ADAS reliability determination value is the ADAS MID, even when the careless driving continues, the controller 150 does not output the warning for the careless driving and does not perform the vehicle stop control. In one example, when the user setting information is the USM HIGH and the ADAS reliability determination value is the ADAS LOW, and when the careless driving continues, the controller 150 may immediately output the warning for the careless driving, and may perform the vehicle stop control when the careless driving continues even after the warning is output.

In addition, when the careless driving continues, and when the user setting information is the USM MID and the ADAS reliability determination value is the ADAS HIGH, the ADAS MID, or the ADAS LOW, or when the user setting information is the USM LOW and the ADAS reliability determination value is the ADAS HIGH, the ADAS MID, or the ADAS LOW, the controller 150 may set the road speed limit as a third speed (a speed 3) when the set speed currently set to the vehicle is greater than the road speed limit, and set (a current speed*0.9) as the third speed (the speed 3) when the current set speed of the vehicle is less than the road speed limit. In addition, the controller 150 may set the vehicle set speed to the third speed. In addition, when the user setting information is the USM MID and the ADAS reliability determination value is the ADAS HIGH, even when the careless driving continues, the controller 150 does not output the warning for the careless driving and does not perform the vehicle stop control. In one example, when the user setting information is the USM MID and the ADAS reliability determination value is the ADAS MID, the controller 150 delays the time point at which the warning for the careless driving is output based on the ADAS operation reliability.

According to an embodiment, when the user setting information is the USM MID and the ADAS reliability determination value is the ADAS MID, the controller 150 may calculate the warning output time point using Equation 1.

warning output time point=(ADAS operation reliability−ADAS MID(min))/(ADAS MID(max)−ADAS MID(min))×maximum warning delayable time <Equation 1>

In this connection, the ADAS MID(min) may mean a minimum value of an ADAS MID range set by the designer, and the ADAS MID(max) may mean a maximum value of the ADAS MID range set by the designer. For example, when the ADAS operation reliability is 75%, the ADAS MID value is set as 70 to 90%, and the maximum warning delayable time is 10 seconds, the warning output time point may be calculated as 2.5 seconds. When the user setting information is the USM MID and the ADAS reliability determination value is the ADAS MID, and when the careless driving continues, the controller 150 may control the warning for the careless driving to be output after 2.5 seconds. In addition, the controller 150 may control the vehicle to stop when the careless driving continues even after a set time for controlling the vehicle stop elapses even after the warning is output after 2.5 seconds.

When the user setting information is the USM MID and the ADAS reliability determination value is the ADAS MID or the ADAS LOW, or when the user setting information is the USM LOW and the ADAS reliability determination value is the ADAS HIGH, the ADAS MID, or the ADAS LOW, and when the careless driving continues, the controller 150 may control the warning for the careless driving to be output immediately, and may control the vehicle stop control to be performed when the careless driving continues even after the set time for controlling the vehicle stop elapses even after the warning is output.

When the careless driving of the user continues and the travel speed based on the user setting information and the ADAS reliability determination value is set as one of the first speed, the second speed, and the third speed, the controller 150 may output a guide message informing that the vehicle set speed has changed. When the careless driving of the user is terminated, the travel speed may return to a speed initially set by the user, and the output of the guide message may be stopped.

In addition, when the careless driving of the user continues, the controller 150 may set the travel speed such that a preset inter-vehicle distance to an obstacle in front of the vehicle (a preceding vehicle) is maintained. When the careless driving of the user is terminated, the setting of the inter-vehicle distance may return to an inter-vehicle distance that is initially set.

Figure 8:
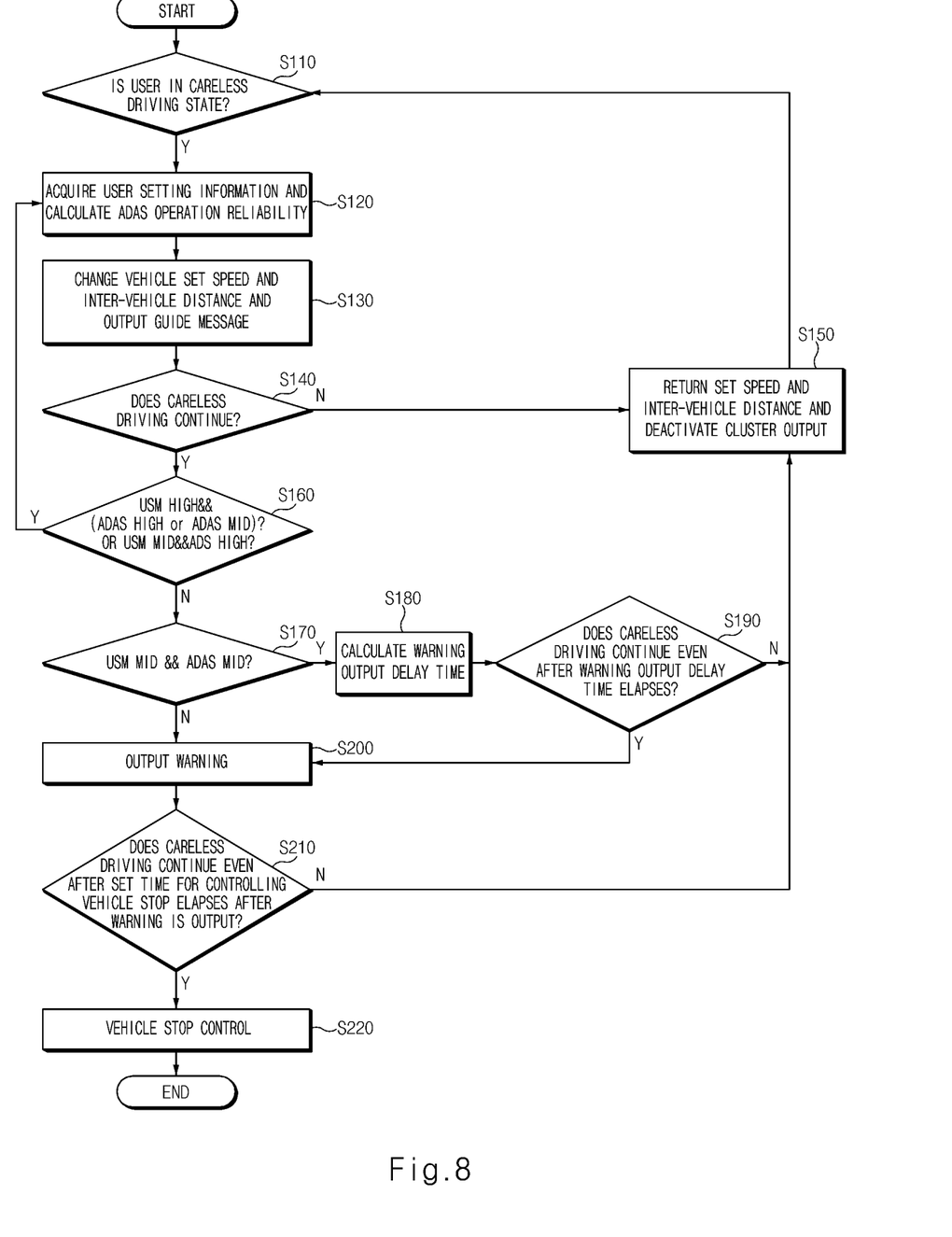
FIG. 8 is a flowchart illustrating a travel control method of a vehicle according to an embodiment of the present disclosure.

FIG. 8 is a flowchart illustrating a travel control method of a vehicle according to an embodiment of the present disclosure.

As shown in FIG. 8, the controller 150 may determine whether the user is in the careless driving state based on the user state information sensed by the sensor 110 (S110). According to an embodiment, when the user is in the drowsy state or the state in which the user is not looking forward in S110, the controller 150 may determine that the user is in the careless driving state based on the user state information.

The controller 150 may calculate the ADAS operation reliability based on the travel information of the vehicle and the surroundings information of the vehicle sensed by the sensor 110 (S120). According to an embodiment, the controller 150 may calculate the ADAS operation reliability as the smallest value among the first reliability for the ADAS operation condition, the second reliability for the smart cruise control (SCC) operation, and the third reliability for the lane following assist (LFA) operation in S120. The ADAS operation reliability may have a value between 0% and 100%. Refer to FIG. 2 for more detailed description described above.

In addition, according to an embodiment of the present disclosure, the controller 150 may acquire the user setting information input through the input device 130 in S120. In this connection, the user setting information may be input as the USM HIGH when the careless driving of the user is allowed without the specific condition, input as the USM MID when the careless driving of the user is allowed based on the ADAS operation reliability, and input as the USM LOW when the careless driving of the user is not allowed.

The controller 150 may change the speed of the vehicle to the vehicle set speed set based on the ADAS operation reliability, and change the inter-vehicle distance to the obstacle in front of the vehicle (the preceding vehicle) to the preset inter-vehicle distance (S130). In addition, the controller 150 may output a guide message informing that the vehicle set speed and the inter-vehicle distance has been changed in S130.

The controller 150 may determine whether the careless driving of the user continues (S140). When it is determined that the careless driving of the user does not continue (N), the controller 150 may return the travel speed to the travel speed initially set by the user and return the inter-vehicle distance to the inter-vehicle distance initially set by the user, and stop the output of the guide message (S150). Then, S110 is performed.

In one example, when it is determined that the careless driving of the user continues (Y at S140), the controller 150 may determine whether a first condition including a case in which the user setting information is the USM HIGH and the ADAS reliability determination value is the ADAS HIGH or the ADAS MID, or a second condition including a case in which the user setting information is the USM MID and the ADAS reliability determination value is the ADAS HIGH is satisfied (S160).

When one of the first condition and the second condition is satisfied (Y) in S160, the controller 150 may not output the warning, may not perform the vehicle stop control, and may perform S120. That is, embodiments of the present disclosure may prevent the user from feeling discomfort by not outputting the warning and not performing the vehicle stop control based on the user setting information and the ADAS reliability determination value even when the user continues the careless driving.

In addition, when both the first condition and the second condition are not satisfied (N) in S160, the controller 150 determines whether a third condition including a case in which the user setting information is the USM MID and the ADAS reliability determination value is the ADAS MID is satisfied (S170).

When it is determined in S170 that the third condition is satisfied (Y), the controller 150 may calculate the warning output delay time (S180). According to an embodiment, the controller 150 may calculate the warning output delay time using Equation 1. The controller 150 may determine whether the careless driving continues even after the warning output delay time elapses (S190). In one example, when it is determined in S170 that the third condition is not satisfied, the controller 150 may control the warning to be output immediately when the careless driving of the user is determined (S200).

Even when it is determined in S190 that the careless driving of the user continues even after the warning output delay time elapses (Y), the controller 150 may control to output the warning (S200). In one example, when it is determined that the careless driving of the user did not continue enough to pass the warning output delay time (N) in S190, the controller 150 may determine that the careless driving of the user is terminated and perform S150.

The controller 150 may determine whether the careless driving of the user continues even after the set time for controlling the vehicle stop elapses after the warning is output (S210). When it is determined in S210 that the careless driving of the user continues even after the set time for controlling the vehicle stop elapses, the controller 150 may perform the vehicle stop control (S220). In one example, when it is determined in S210 that the careless driving of the user is terminated without passing the set time for controlling the vehicle stop (N), the controller 150 may perform S150.

Figure 9:
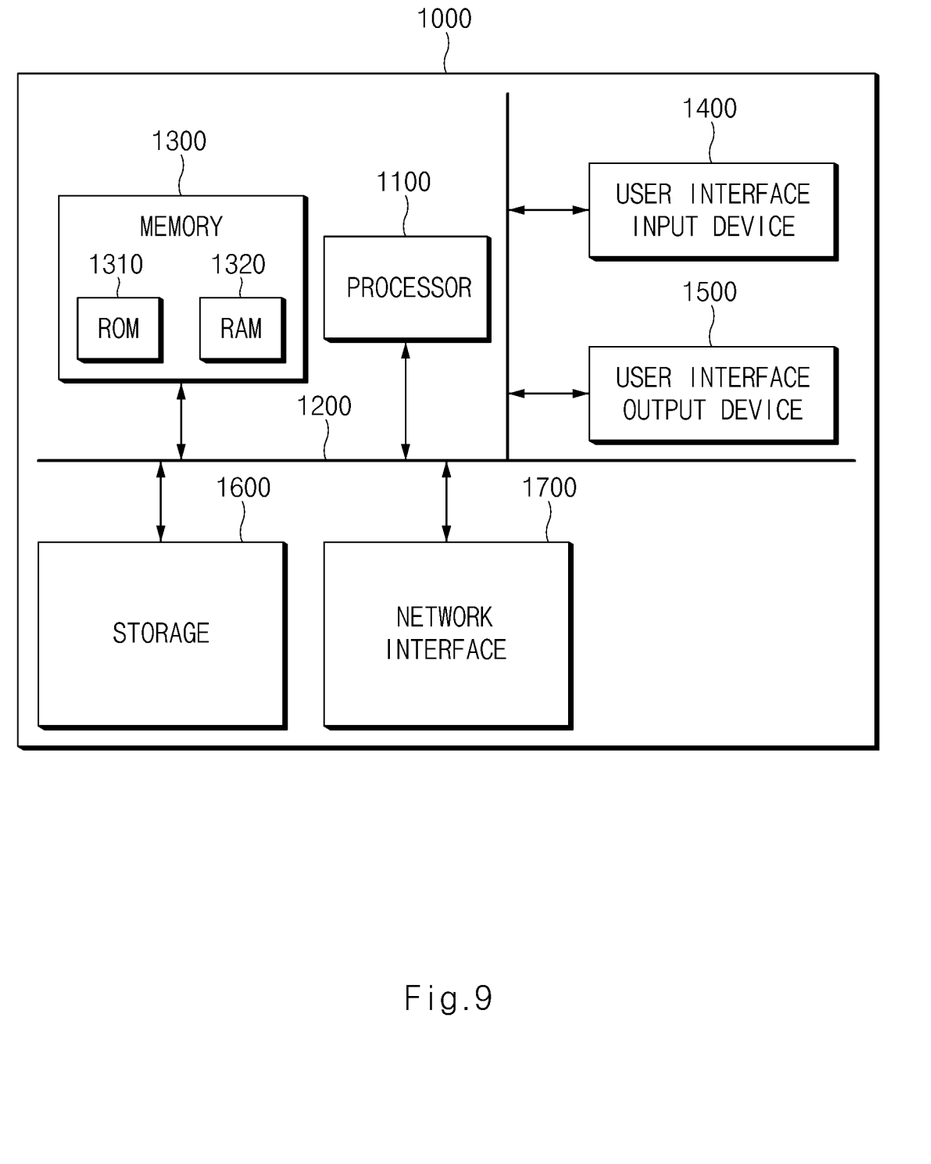
FIG. 9 illustrates a configuration of a computing system executing a method according to an embodiment of the present disclosure.

FIG. 9 illustrates a configuration of a computing system executing a method according to an embodiment of the present disclosure.

With reference to FIG. 9, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for controlling the travel of the vehicle according to an embodiment of the present disclosure may prevent the warning for the careless driving and the vehicle stop control from being frequently performed based on the ADAS operation reliability, and change the inter-vehicle distance and the set speed to improve the travel stability, thereby minimizing the discomfort felt by the user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling travel of a vehicle, the device comprising:
   an input device configured to receive user setting information;
   a sensor configured to acquire user state information, travel information of the vehicle, and vehicle surroundings information; and
   a controller configured to:
      calculate an ADAS operation reliability based on the travel information of the vehicle and the vehicle surroundings information;
      calculate at least one of a vehicle set speed and/or a warning time point based on the user setting information and an ADAS reliability determination value when careless driving of a user is determined based on the user state information; and
      determine whether to perform vehicle stop control.

2. The device of claim 1, wherein the user setting information is input as USM HIGH when the careless driving of the user is allowed, as USM MID when the careless driving of the user is allowed based on the ADAS operation reliability, and as USM LOW when the careless driving of the user is not allowed.

3. The device of claim 2, wherein the controller is configured to set the ADAS reliability determination value as one of ADAS LOW, ADAS MID, and ADAS HIGH based on a magnitude of the ADAS operation reliability.

4. The device of claim 3, wherein the controller is configured to:
   compare a set speed preset to the vehicle with an ADAS maximum safety speed or a road speed limit set in advance based on the user setting information and the ADAS reliability determination value when the careless driving of the user is continued; and
   calculate the vehicle set speed based on a result of the comparison.

5. The device of claim 3, wherein the controller is configured to determine whether a first condition where the user setting information is the USM HIGH and the ADAS reliability determination value is the ADAS HIGH or the ADAS MID, or a second condition where the user setting information is the USM MID and the ADAS reliability determination value is the ADAS HIGH, is satisfied.

6. The device of claim 5, wherein the controller is configured to not output a warning for the careless driving of the user and not perform the vehicle stop control when one of the first condition and the second condition is satisfied.

7. The device of claim 5, wherein the controller is configured to determine whether a third condition where the user setting information is the USM MID and the ADAS reliability determination value is the ADAS MID is satisfied when the first condition and the second condition are not satisfied.

8. The device of claim 7, wherein the controller is configured to:
   calculate a warning output delay time based on the ADAS operation reliability and the ADAS MID when the third condition is satisfied; and
   control a warning to be output after the warning output delay time elapses when the careless driving of the user continues even after the warning output delay time elapses.

9. The device of claim 7, wherein the controller is configured to control a warning to be output immediately when the careless driving of the user is determined when the third condition is not satisfied.

10. The device of claim 9, wherein the controller is configured to determine to stop the vehicle when the careless driving of the user continues even after a set time for controlling the vehicle stop elapses after the warning is output.

11. A method for controlling travel of a vehicle, the method comprising:
   receiving user setting information;
   acquiring user state information, travel information of the vehicle, and vehicle surroundings information;
   calculating an ADAS operation reliability based on the travel information of the vehicle and the vehicle surroundings information;
   calculating at least one of a vehicle set speed and/or a warning time point based on the user setting information and an ADAS reliability determination value when careless driving of a user is determined based on the user state information; and
   determining whether to perform vehicle stop control.

12. The method of claim 11, wherein receiving the user setting information includes receiving the user setting information as USM HIGH when the careless driving of the user is allowed, as USM MID when the careless driving of the user is allowed based on the ADAS operation reliability, and as USM LOW when the careless driving of the user is not allowed.

13. The method of claim 12, wherein the ADAS reliability determination value is set as one of ADAS LOW, ADAS MID, and ADAS HIGH based on a magnitude of the ADAS operation reliability.

14. The method of claim 13, wherein a set speed preset to the vehicle is compared with an ADAS maximum safety speed or a road speed limit set in advance based on the user setting information and the ADAS reliability determination value when the careless driving of the user is continued, and the vehicle set speed is calculated based on a result of the comparison.

15. The method of claim 13, further comprising:
   determining whether a first condition where the user setting information is the USM HIGH and the ADAS reliability determination value is the ADAS HIGH or the ADAS MID, or a second condition including a case where the user setting information is the USM MID and the ADAS reliability determination value is the ADAS HIGH, is satisfied.

16. The method of claim 15, wherein a warning for the careless driving of the user is not output and the vehicle stop control is not performed when one of the first condition and the second condition is satisfied.

17. The method of claim 15, further comprising:
   determining whether a third condition where the user setting information is the USM MID and the ADAS reliability determination value is the ADAS MID is satisfied when the first condition and the second condition are not satisfied.

18. The method of claim 17, further comprising:
   calculating a warning output delay time based on the ADAS operation reliability and the ADAS MID when the third condition is satisfied; and
   controlling a warning for the careless driving of the user to be output after the warning output delay time elapses when the careless driving of the user continues even after the warning output delay time elapses.

19. The method of claim 17, further comprising controlling a warning for the careless driving of the user to be output immediately when the careless driving of the user is determined when the third condition is not satisfied.

20. The method of claim 19, further comprising determining the vehicle is to be stopped when the careless driving of the user continues even after a set time for controlling the vehicle stop elapses after the warning is output.

\* \* \* \* \*